United States Patent
Cross et al.

(10) Patent No.: US 9,954,687 B2
(45) Date of Patent: *Apr. 24, 2018

(54) ESTABLISHING A WIRELESS CONNECTION TO A WIRELESS ACCESS POINT

(71) Applicant: International Business Machines Corporation, Armonk, NY (US)

(72) Inventors: Thomas J. Cross, Atlanta, GA (US); David B. Dewey, Milton, GA (US); Takehiro Takahashi, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,204

(22) Filed: Oct. 23, 2015

(65) Prior Publication Data

US 2016/0043871 A1 Feb. 11, 2016

Related U.S. Application Data

(63) Continuation of application No. 12/652,973, filed on Jan. 6, 2010, now Pat. No. 9,197,420.

(51) Int. Cl.
*H04L 9/32* (2006.01)
*H04L 29/06* (2006.01)
(Continued)

(52) U.S. Cl.
CPC .......... *H04L 9/3268* (2013.01); *H04L 9/3247* (2013.01); *H04L 9/3263* (2013.01);
(Continued)

(58) Field of Classification Search
CPC ... H04L 9/3268; H04L 63/0428; H04L 63/06; H04L 9/3247; H04W 12/04; H04W 12/06; H04W 84/12
See application file for complete search history.

(56) References Cited

U.S. PATENT DOCUMENTS 6,134,327 A 10/2000 Van Oorschot
7,185,204 B2 2/2007 Narayanaswami et al.
(Continued)

FOREIGN PATENT DOCUMENTS

EP 2063358 A2 5/2009

OTHER PUBLICATIONS

Ali Bakirdan et al., "Security Algorithms in Wireless LAN: Proprietary or non-Proprietary", 2003 IEEE, pp. 1425-1429.*
(Continued)

*Primary Examiner* — Luu Pham
*Assistant Examiner* — Canh Le
(74) *Attorney, Agent, or Firm* — Yee & Associates, P.C.; Lisa J. Ulrich

(57) ABSTRACT

A method and apparatus for establishing a wireless connection. A digital certificate having a second name is obtained by a processor unit in response to receiving a selection of a network using a first name broadcast by a wireless access point. A determination is made by the processor unit as to whether the digital certificate is valid. A determination is made by the processor unit as to whether the second name in the digital certificate matches the first name broadcast by the wireless access point. The processor unit establishes the wireless connection to the wireless access point in response to the digital certificate being valid and the second name in the digital certificate matching the first name broadcast by the wireless access point.

17 Claims, 7 Drawing Sheets

(51) Int. Cl.
*H04W 12/06* (2009.01)
*H04W 12/04* (2009.01)
*H04W 84/12* (2009.01)

(52) U.S. Cl.
CPC .......... *H04L 63/0428* (2013.01); *H04L 63/06* (2013.01); *H04L 63/0823* (2013.01); *H04W 12/04* (2013.01); *H04W 12/06* (2013.01); *H04L 2209/80* (2013.01); *H04W 84/12* (2013.01)

(56) References Cited

U.S. PATENT DOCUMENTS

| | | | |
|---|---|---|---|
| 9,197,420 | B2 | 11/2015 | Cross et al. |
| 2001/0011250 | A1 | 8/2001 | Paltenghe et al. |
| 2003/0115460 | A1* | 6/2003 | Arai ............... H04W 12/04 713/168 |
| 2003/0163567 | A1 | 8/2003 | McMorris et al. |
| 2003/0182549 | A1* | 9/2003 | Hallin ............... G06F 21/33 713/156 |
| 2005/0071631 | A1 | 3/2005 | Langer |
| 2006/0045267 | A1* | 3/2006 | Moore ............... H04L 63/061 380/247 |
| 2006/0064588 | A1* | 3/2006 | Tidwell ............... G06F 21/316 713/169 |
| 2006/0064589 | A1 | 3/2006 | Taniguchi et al. |
| 2007/0203849 | A1 | 8/2007 | Cameron et al. |
| 2008/0025278 | A1* | 1/2008 | Hoecker ............... H04W 76/02 370/338 |
| 2009/0187983 | A1 | 7/2009 | Zerfos et al. |
| 2009/0222902 | A1* | 9/2009 | Bender ............... H04L 63/0823 726/10 |
| 2009/0232311 | A1 | 9/2009 | Meier et al. |
| 2010/0070771 | A1 | 3/2010 | Chen et al. |
| 2010/0106966 | A1* | 4/2010 | Santos ............... H04L 12/66 713/156 |
| 2010/0125737 | A1* | 5/2010 | Kang ............... G06Q 20/12 713/176 |
| 2010/0146614 | A1* | 6/2010 | Savoor ............... H04L 63/0823 726/10 |
| 2010/0275249 | A1 | 10/2010 | McCann et al. |
| 2010/0293590 | A1 | 11/2010 | Dandabany |
| 2011/0010366 | A1 | 1/2011 | Varshavsky et al. |
| 2011/0038357 | A1* | 2/2011 | Gong ............... H04W 48/16 370/338 |
| 2011/0167263 | A1 | 7/2011 | Cross et al. |

OTHER PUBLICATIONS

Ali Bakirdan et al., "Security Algorithm in Wireless LAN: Proprietary on non-Proprietary", 2003 IEEE, pp. 1425-1429.*
John Vollbercht, "Wireless LAN access Control and Authentication", Interlink Networks, 2002, pp. 1-29.*
Bakirdan et al., "Security Algorithms in Wireless LAN: Proprietary or non-Proprietary," IEEE Global Telecommunications Conference (GLOBECOM '03), vol. 3, Dec. 2003, pp. 1425-1429.
Elkeelany et al., "Performance Comparisons, des gn, and Implementation of RC5 Symmetric Encryption Core using Reconfigurable Hardware", Journal of Computers, vol. 3, No. 3, Mar. 2008, pp. 48-55.
Housley et al., "Certificate Extensions and Attributes Supporting Authentication in Point-to-Point Protocol (PPP) and Wireless Local Area Networks (WLAN)", Network Working Group Request for Comments: 3770, May 2004, 8 pages.
Kopsidas et al., "Implementing a VIPSec Based Application for Handhelds: Design and Optimization Issues", Proceedings of the 3rd International Conference on Mobile Multimedia Communications (MobiMedia '07), Aug. 2007, 6 pages.
Mockapetris, "Domain Names—Concepts and Facilities", Network Working Group Request for Comments: 1034, Nov. 1987, 47 pages.
Simon et al., "The EAP-TLS Authentication Protocol", Network Working Group Request for Comments: 5216, Mar. 2008, 35 pages.
Vollbrecht et al., "Wireless LAN Access Control and Authentication; 802.11b Wireless Networking and Why it Needs Authentication," Interlink Networks, copyright 2002, 30 pages.
Wu et al., "Improvement Security for RuBee Radio-WIMAX Mesh Networks", Proceedings of the International Conference on Mobile Technology, Applications, and Systems (Mobility '08), Sep. 2008, 4 pages.
Office Action, dated Mar. 13, 2012, regarding U.S. Appl. No. 12/652,973, 17 pages.
Final Office Action, dated Aug. 2, 2012, regarding U.S. Appl. No. 12/652,973, 17 pages.
Office Action, dated Jul. 29, 2014, regarding U.S. Appl. No. 12/652,973, 25 pages.
Final Office Action, dated Jan. 2, 2015, regarding U.S. Appl. No. 12/652,973, 29 pages.
Notice of Allowance, dated Jul. 20, 2015, regarding U.S. Appl. No. 12/652,973, 21 pages.

\* cited by examiner

ESTABLISHING A WIRELESS CONNECTION TO A WIRELESS ACCESS POINT

CROSS-REFERENCE TO RELATED APPLICATION(S)

This application is a continuation of and claims the benefit of priority to U.S. patent application Ser. No. 12/652,973, filed on Jan. 6, 2010 and entitled "Using Information in a Digital Certificate to Authenticate a Network of a Wireless Access Point", the contents of which are incorporated herein by reference.

BACKGROUND

1. Field

The disclosure relates generally to an improved data processing system and, more specifically, to a method and apparatus for establishing a connection to exchange information. Still more particularly, the disclosure relates to a method and apparatus for establishing a secure wireless connection without a pre-shared key.

2. Description of the Related Art

With wireless connections, many types of devices are able to connect to a network. These wireless connections often take the form of Wi-Fi connections, which are a trademark of the Wi-Fi Alliance. These types of connections are implemented using IEEE 802.11 standards.

A device may establish a wireless connection to a wireless access point. A wireless access point is a device that allows a wireless communications device to connect to a wireless network. These wireless access points can relay data between wireless devices, such as computers, mobile phones, printers, and wired devices, over a network.

Wireless access points may be open or closed. An open wireless access point does not use any encryption but allows any user to connect to the wireless access point. A closed wireless access point only allows authorized users to connect to the wireless access point. A closed wireless access point may, however, provide confidentiality for the information exchanged by a wireless communications device and the wireless access point.

A closed wireless access point uses encryption and a pre-shared key and/or password. The pre-shared key is an encryption key that is known by the user wanting to access the wireless access point and the wireless network. The use of pre-shared keys and/or passwords increases the confidentiality of information and reduces the chances of connecting to an unauthorized wireless access point. This process, however, can be cumbersome. The process may require the user to obtain a key before establishing a wireless connection to exchange information. This step may require additional time and effort. The additional time and effort may reduce the usefulness of establishing a wireless connection, especially if the user may only need the communications link for a short period of time.

With an open wireless access point, a user may more easily establish a wireless connection with the wireless access point as compared to a closed wireless access point. Information exchanged between the device and the wireless access point, however, is not protected. In other words, the information is not encrypted and can be viewed by other users.

Further, a wireless access point typically broadcasts a name to identify the wireless access point or network provider. This name may be referred to as a service set identifier (SSID). With an open wireless access point, a service set identifier that is similar to a service set identifier for a trusted network provider may be broadcast by an unauthorized wireless access point. If a user accesses this unauthorized wireless access point believing that it is authorized by the trusted network provider, the user may be steered away from legitimate services. Further, this unauthorized wireless access point may be able to obtain user and password information and other confidential information. For example, some wireless access services request a user to enter credit card information to access the service. An unsuspecting user may enter credit card information into a webpage believing that the webpage is for the trusted network provider or a legitimate website. Instead, the credit card information is entered into a webpage that is a forgery of the legitimate website.

An encrypted wireless access point requires that a key be pre-set and shared with the user before the user establishes a communications link. With the name and the pre-shared key, the likelihood of establishing a wireless connection with an unauthorized wireless access point is reduced.

Therefore, it would be advantageous to have a method and apparatus that takes into account one or more of the issues discussed above, as well as possibly other issues.

SUMMARY

In an illustrative embodiment, a method and apparatus are present for establishing a wireless connection. A digital certificate having a second name is obtained by a processor unit in response to receiving a selection of a network using a first name broadcast by a wireless access point. A determination is made by the processor unit as to whether the digital certificate is valid. A determination is made by the processor unit as to whether the second name in the digital certificate matches the first name broadcast by the wireless access point. The processor unit establishes the wireless connection to the wireless access point in response to the digital certificate being valid and the second name in the digital certificate matching the first name broadcast by the wireless access point.

DETAILED DESCRIPTION

Figure 1:
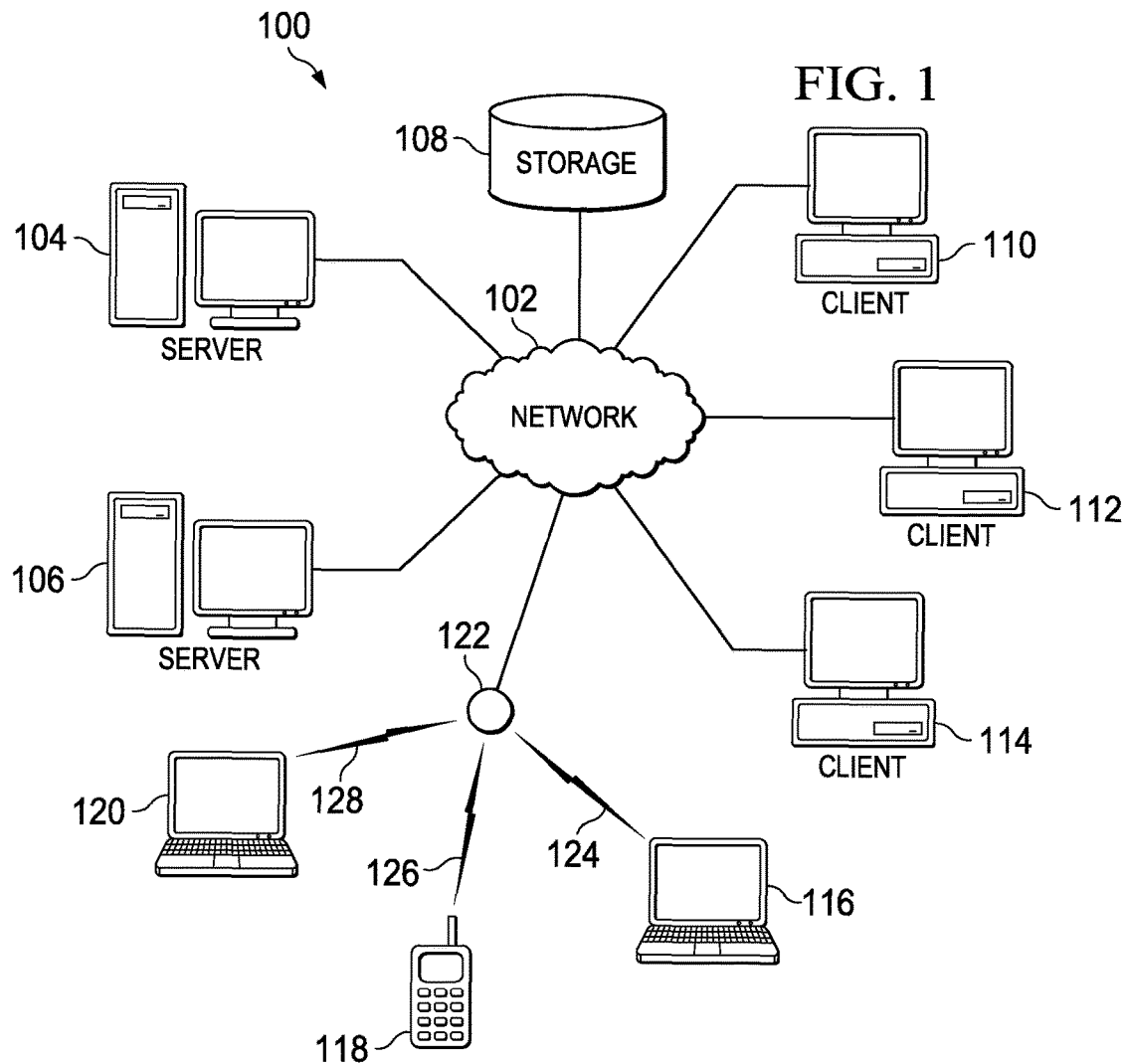
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) having a physical or tangible form may be utilized. The computer usable or computer readable medium may be, for example, but not limited to, an electronic magnetic storage media, optical storage media, electromagnetic storage media, or semiconductor storage media. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), a portable compact disk read-only memory (CDROM), an optical storage device, or a magnetic storage device.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide processes for implementing the functions/acts specified in the flowchart and/or block diagram block or blocks.

Figure 2:
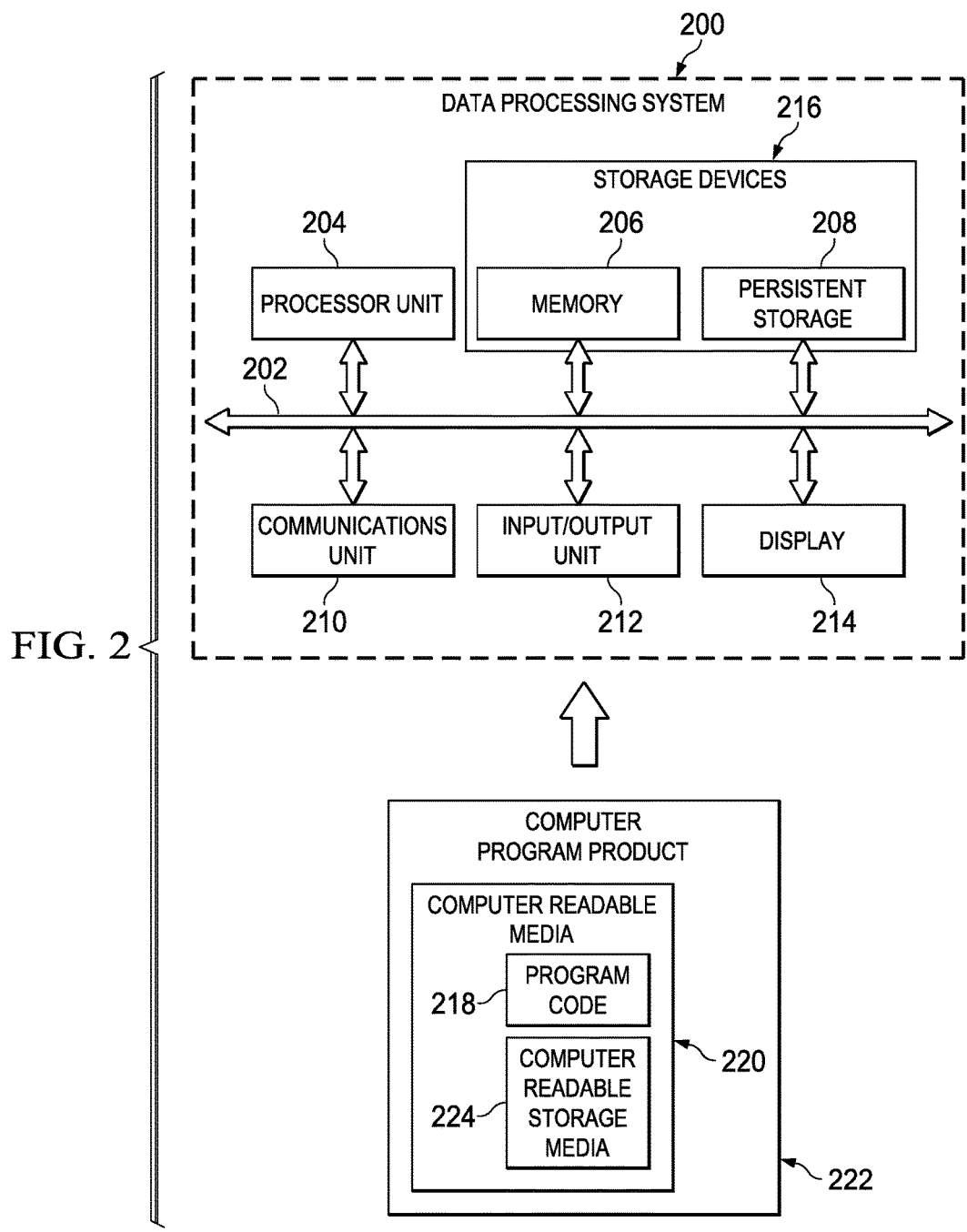
FIG. 2 is a diagram of a data processing system in accordance with an illustrative embodiment.

With reference now to the figures and, in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110, 112, and 114 connect to network 102. Client devices 110, 112, and 114 may be, for example, personal computers or network computers. In the depicted example, server computer 104 provides information, such as boot files, operating system images, and applications, to client devices 110, 112, and 114. Client devices 110, 112, and 114 are clients to server computer 104 in this example.

Additionally, client devices 116, 118, and 120 are present. These client devices may be, for example, without limitation, a laptop computer, a mobile phone, and/or some other suitable type of wireless device. In this example, these clients are devices that communicate using wireless communications links. These client devices connect to network 102 through wireless access point 122. The client devices establish wireless connections 124, 126, and 128 with wireless access point 122. In the different illustrative examples, these connections may be established using one or more illustrative embodiments. Network data processing system 100 may include additional server computers, client devices, and/or other devices not shown.

Program code located in network data processing system 100 may be stored on a computer recordable storage medium and downloaded to a data processing system or other device for use. For example, program code may be stored on a computer recordable storage medium on server computer 104 and downloaded to client device 110 over network 102 for use on client device 110. In the different illustrative embodiments, the program code may be run on a client to establish wireless connections with wireless access point 122 that may be more secure than an open wireless access point, but less cumbersome than a closed wireless access point.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an illustrative embodiment. In this depicted example, data processing system 200 includes communications fabric 202, which provides communications between processor unit 204, memory 206, persistent storage 208, communications unit 210, input/output (I/O) unit 212, and display 214. In these illustrative embodiments, data processing system 200 may be used to implement client devices, such as, for example, without limitation, client devices 110, 112, 114, 116, 118, and 120. For example, data processing system 200 may be used to implement a laptop computer, a mobile phone, or some other suitable type of wireless hardware device. Additionally, data processing system 200 may be used to implement a server computer, such as server computer 104 and server computer 106, or other types of computers.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links. Communications unit 210 may be used to establish a wireless connection with a wireless access point, such as, for example, wireless access point 122 in FIG. 1.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 via a network. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system via a network for use within data processing system 200. For instance, program code stored in computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments provide a method and apparatus for establishing a wireless connection. A selection of a wireless access point from a number of available wireless access points is received. The selection of the wireless access point may be made by selecting a name broadcast by the wireless access point. In response to receiving the selection, a request is sent to the wireless access point to begin a process to establish a connection with the network. In response, a digital certificate is received from the wireless access point. A determination is made as to whether the digital certificate is valid. Further, a determination is made as to whether a name in the digital certificate matches a name broadcast by the wireless access point. In response to the digital certificate being valid and the name of the digital certificate matching the name for the wireless access point, a session key is generated using the digital certificate. Once the session key has been generated, the wireless connection is established. Information can be exchanged with the wireless access point confidentially using this wireless connection.

Figure 3:
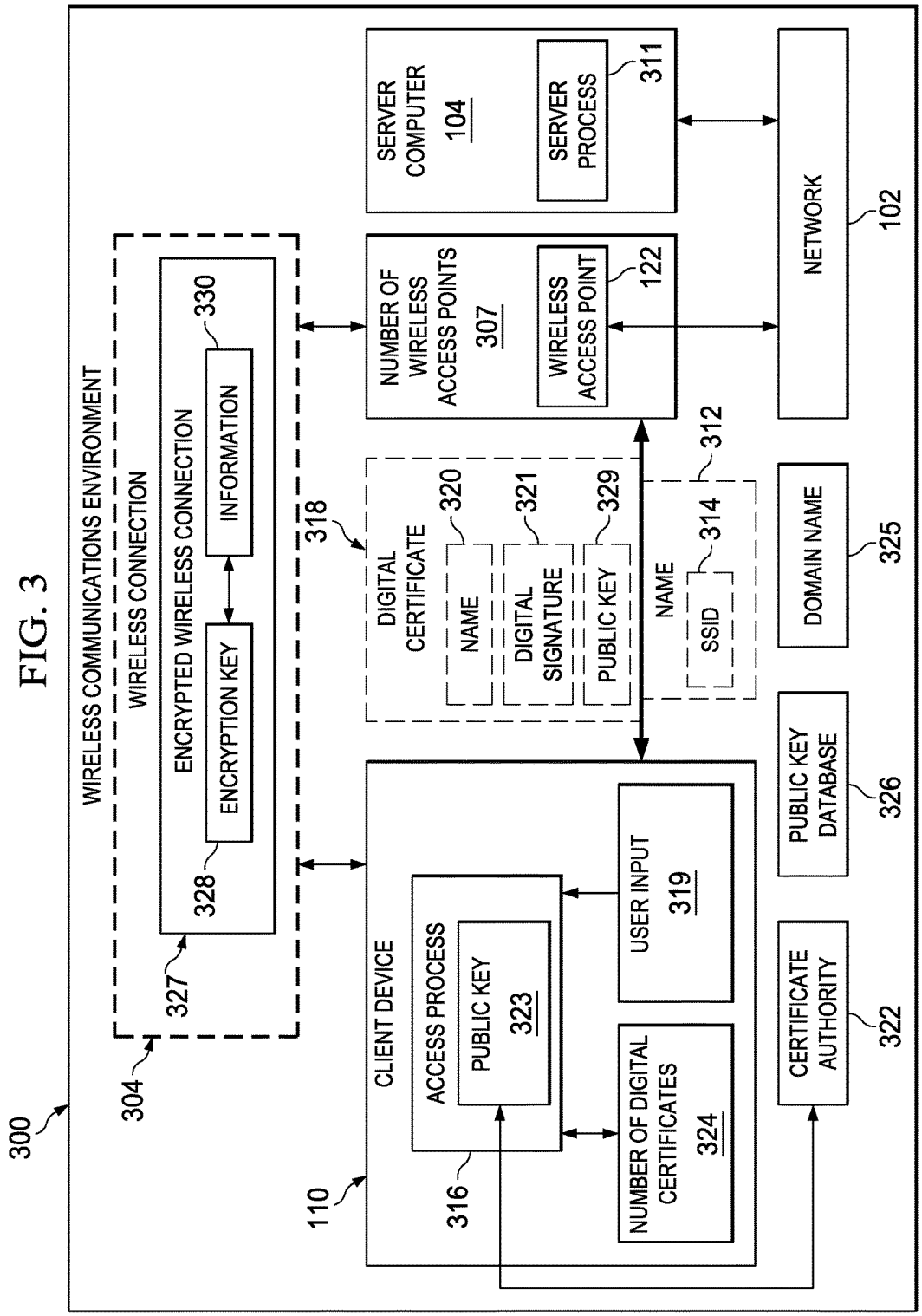
FIG. 3 is an illustration of a wireless communications environment in accordance with an illustrative embodiment.

With reference now to FIG. 3, an illustration of a wireless communications environment is depicted in accordance with an illustrative embodiment. Wireless communications environment 300 may be implemented using all or portions of network data processing system 100 in FIG. 1.

As depicted, client device 110 may establish wireless connection 304 to wireless access point 122 within number of wireless access points 307. Wireless access point 122 provides a connection to network 102. In this depicted example, network 102 may take a number of different forms. For example, without limitation, network 102 may be a local area network, a wide area network, an intranet, and/or the Internet. In these illustrative examples, client device 110 may take a number of different forms. For example, client device 110 may be computer implemented using data processing system 200 in FIG. 2. Additionally, client device 110 also may be, for example, without limitation, a mobile phone or other device having a processor unit.

Server computer 104 may be implemented using data processing system 200 in FIG. 2. In this illustrative example, server process 311 running on server computer 104 processes a request from client device 110 to access network 102 through wireless access point 122. Server process 311 and wireless access point 122 communicate using a network authentication protocol. This network authentication protocol may be, for example, without limitation, the Radius protocol or some other suitable network authentication protocol. In other illustrative embodiments, the actions performed by server process 311 may be performed by a process running within wireless access point 122.

In these illustrative examples, wireless access point 122 broadcasts name 312. Name 312 is the name for network 102. Name 312 provides an identification of network 102. In this manner, users, such as those of client device 110, may be able to detect the presence of network 102. Further, name 312 may allow a user to distinguish network 102 from other networks that may be present and have wireless access points. Name 312 may be service set identifier (SSID) 314 if wireless communications environment 300 uses IEEE 802.11 specification for wireless local area networks. In other illustrative examples, other wireless access points in addition to or in place of wireless access point 122 in number of wireless access points 307 broadcast name 312 for network 102.

As illustrated, access process 316 runs on client device 110. If user input is received to select name 312 for network 102, access process 316 sends a request to establish a wireless connection to wireless access point 122 to access network 102. Wireless access point 122 contacts server process 311 on server computer 104 to process the request. In response, server process 311 sends digital certificate 318 to wireless access point 122. Wireless access point 122 sends digital certificate 318 to client device 110. In these illustrative examples, digital certificate 318 is sent and received using a standard authentication protocol. Extensible authentication protocol-transport layer security (EAP-TLS) is an example of the standard authentication protocol used in these illustrative examples.

Digital certificate 318 is an electronic document that may be used to verify the identity of network 102 in these examples. Digital certificate 318 may be an electronic document containing digital signature 321. In these illustrative examples, digital certificate 318 also includes name 320. A signed digital certificate may be obtained from a trusted authority. For example, without limitation, digital certificate 318 may be obtained from a trusted authority, such as VeriSign, Inc.

Access process 316 running on client device 110 determines whether digital certificate 318 is valid. This validity may be determined in a number of different ways. For example, access process 316 determines whether digital signature 321 in digital certificate 318 was signed by certificate authority 322. Access process 316 uses public key 323 associated with certificate authority 322 to determine whether digital signature 321 was signed by certificate authority 322. By determining that digital signature 321 in digital certificate 318 was signed by certificate authority 322, access process 316 verifies the identity of network 102. Certificate authority 322, in this example, is an entity that issued digital certificate 318. Certificate authority 322 is an entity that issues digital certificates for other parties. Certificate authority 322 is a trusted third party in these examples.

The validity of digital certificate 318 also may be determined by comparing digital certificate 318 to number of digital certificates 324 stored on client device 110. Number of digital certificates 324 is a number of digital certificates that has been validated and/or trusted by client device 110 during a prior access to a network. A number, as used herein with reference to items, means one or more items. For example, number of digital certificates 324 is one or more digital certificates.

Another manner in which digital certificate 318 may be verified as being valid is if user input 319 is received by access process 316 indicating that digital certificate 318 should be trusted. This type of validation may be used in the event that digital certificate 318 is not issued by certificate authority 322 or another trusted certificate authority. Additionally, this type of validation may be used if digital certificate 318 is not present in number of digital certificates 324.

Additionally, access process 316 determines whether name 320 in digital certificate 318 matches name 312 as broadcast by wireless access point 122. If name 320 matches name 312 in digital certificate 318 and digital certificate 318 is identified as being valid, access process 316 continues to perform actions to establish encrypted wireless connection 327. In these illustrative examples, encrypted wireless connection 327 is not considered established until encryption key 328 is generated. In these illustrative examples, encryption key 328 is generated by access process 316 in conjunction with wireless access point 122 and server process 311.

In these illustrative examples, domain name 325 is used for name 320 and name 312. Domain name 325 is unique between different networks or service providers. If other types of names are used other than domain name 325, a certificate authority may verify that the name is unique with respect to other names that may be used in the certificates for this type of process used to establish connections.

For example, a database may be created to ensure that a name used for name 312 in digital certificate 318 is unique from other names that may be used. The database may be a public database of service set identifiers that may have been certified by a trusted authority. If this type of database is used, these names also may be used by client device 110 in addition to maintaining number of digital certificates 324.

For example, another manner in which digital certificate 318 may be determined as being trusted is by determining whether public key 329 in digital certificate 318 is present in public key database 326. In these examples, public key 329 is a public key that is different than public key 323. Public key 329 is a public key for a wireless network operator. Public key database 326 is a database containing a number of public keys for a number of wireless network operators that are known to be trusted. A wireless network operator can be considered to be trusted in a number of different ways. For example, a wireless network operator may be considered to be trusted using the collective opinions of the database users. In these illustrative examples, a copy of public key database 326 is hosted on the Internet. Access process 316, in these examples, has a local copy of public key database 326 for use when accessing network 102.

In these illustrative examples, wireless connection 304 takes the form of encrypted wireless connection 327. Encrypted wireless connection 327 is established by using encryption key 328. Digital certificate 318 is used to generate encryption key 328. Encryption key 328 is used to encrypt information 330 sent over encrypted wireless connection 327. In this manner, secure communication is established between client device 110 and network 102 without using a pre-shared key. For example, encryption key 328 may be a session key. This session key is a single-use key for encrypting messages in one communications session.

In this illustrative example, access process 316, along with server process 311 and wireless access point 122, use digital certificate 318 to generate encryption key 328. In the depicted examples, encryption key 328 is generated using a standard authentication protocol, such as extensible authentication protocol-transport layer security (EAP-TLS).

Figure 4:
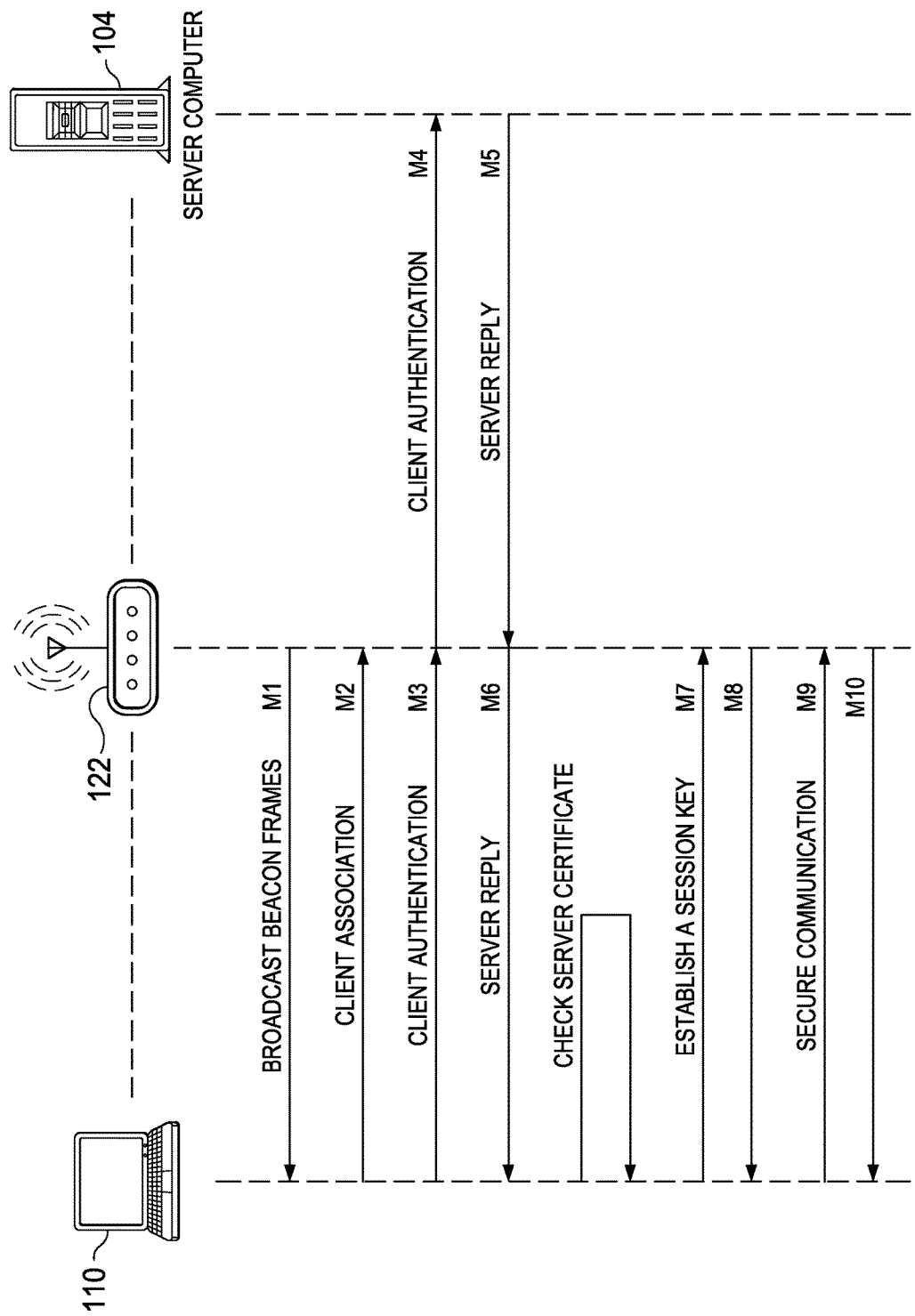
FIG. 4 is an illustration of message flow in establishing a wireless communications link in accordance with an illustrative embodiment.

With reference now to FIG. 4, an illustration of message flow in establishing a wireless communications link is depicted in accordance with an illustrative embodiment. The data flow illustrated in FIG. 4 may be implemented using wireless communications environment 300 in FIG. 3. In this message flow, the different messages sent back and forth are specified using a number of different protocols. In these illustrative examples, the messages use, IEEE 802.11 protocol and/or extensible authentication protocol-transport layer security (EAP-TLS) authentication protocol.

In this illustrative example, wireless access point 122 broadcasts information about the network with which wireless access point 122 is associated. In these examples, wireless access point 122 is a secure Wi-Fi access point. In particular, wireless access point 122 broadcasts a beacon frame that is received by client device 110 (message m1). A frame is a unit of digital data transmission. A frame is typically used as part of a link layer protocol. This unit of digital data transmission typically consists of a link layer header followed by a packet containing the data.

In these illustrative examples, a beacon frame is a management frame specified in IEEE 802.11. A beacon frame contains information about the network. The beacon frame includes a media access control header, a frame body, and a frame check sequence. The body of the beacon frame includes information in different fields. This information includes, for example, a timestamp, a beacon interview, capability information, and a service set identifier. In these examples, the service set identifier is the name used to identify the network.

In response to receiving the broadcast, client device 110 may receive user input to select wireless access point 122 based on the name in the broadcast sent in message m1. Client device 110 sends a request to communicate with the network (message m2). This request to communicate with the network in message m2 also may be referred to as a request to associate. This request is received by wireless access point 122. Afterwards, client device 110 sends an authentication request for network authentication (message m3). This authentication request is implemented using an extensible authentication protocol-transport layer security (EAP-TLS) authentication protocol. The authentication request is received by wireless access point 122. In response, wireless access point 122 sends the authentication request to server computer 104 (message m4).

In response to receiving the authentication request, server computer 104 sends a server reply (message m5). This server reply includes a digital certificate. Wireless access point 122 receives the server reply from server computer 104 and sends the server reply to client device 110 (message m6). In these illustrative examples, the server reply provides network authentication to client device 110 without requiring authentication from client device 110.

Client device 110 performs a check of the digital certificate to determine whether the digital certificate is valid. This check may be performed using a trusted authority that issued the digital certificate. The check also may be performed by determining whether the digital certificate matches one previously received and considered valid or trusted by client device 110. Additionally, the check of the digital certificate may be a request to a user to determine whether to trust the digital certificate.

If the check of the digital certificate is successful, client device 110 sends information to wireless access point 122 needed for wireless access point 122 to generate a session key (message m7). The session key is a type of encryption key that is used to encrypt information exchanged between client device 110 and server computer 104. Wireless access point 122 sends information to client device 110 needed for client device 110 to generate the session key (message m8).

In this manner, client device 110 and wireless access point 122 may generate the session key using the digital certificate and the information exchanged between client device 110 and wireless access point 122. In other illustrative examples, information may also be sent to and from server computer 104 such that server computer 104 is involved in generating the session key. In this manner, the session key is generated by client device 110, wireless access point 122, and/or server computer 104.

In this example, once the session key is generated, a connection is established between client device 110 and server computer 104. This connection is used to exchange information. For example, client device 110 sends information (message m9) and receives information (message m10) in a secure manner. The information sent in message m9 and received in message m10 is encrypted using the session key generated in messages m7 and m8. The exchange of information may include, for example, without limitation, data, program code, images, files, commands, and/or other suitable types of information.

Figure 5:
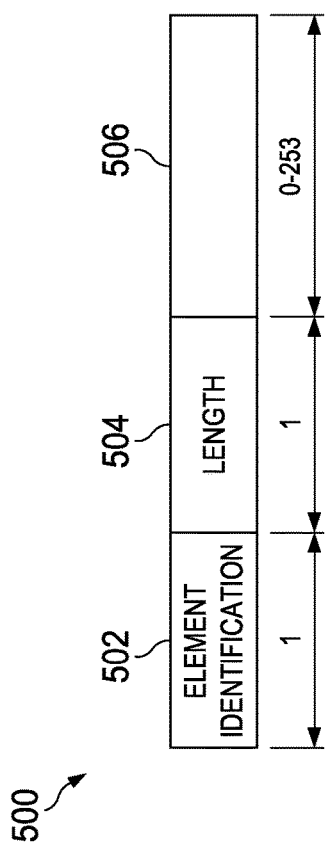
FIG. 5 is an illustration of a frame extension in accordance with an illustrative embodiment.

With reference now to FIG. 5, an illustration of a frame extension is depicted in accordance with an illustrative embodiment. In this illustrative example, frame extension 500 is an example of an extension to a service set identifier that is broadcast in a beacon frame, such as the beacon frame broadcast in message m1 in FIG. 4.

In some illustrative embodiments, the length provided in a service set identifier under IEEE 802.11 may not provide sufficient room for the name of the network. This situation may occur when the name of the network is the same as the name in the digital certificate based on currently used practices. In current digital certificates, the name in the digital certificate is the domain name of the entity that requested the digital certificate from the certificate authority. In other words, the name is the domain name of the entity to which the digital certificate was issued by the certificate authority.

Frame extension 500 provides an extension to the current service set identifier that is broadcast. In this illustrative example, frame extension 500 includes element identifier 502, length 504, and extended service set identifier 506.

Element identifier 502 identifies frame extension 500 as an extension to the service set identifier. Length 504 identifies the length of extended service set identifier 506. Extended service set identifier 506 contains any additional characters that do not fit within the service set identifier. As a result, the service set identifier and extended service set identifier 506 form the name that is broadcast and the name that should be in the digital certificate.

Figure 6:
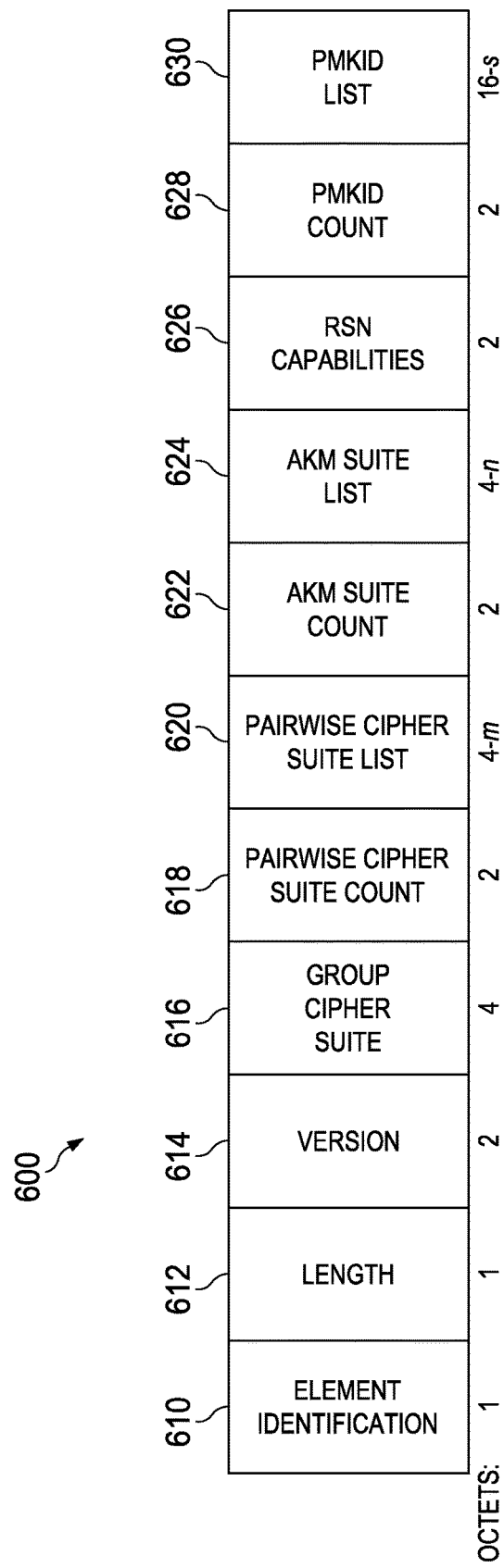
FIG. 6 is an illustration of a robust secure network field in a broadcast frame in accordance with an illustrative embodiment.

With reference now to FIG. 6, an illustration of a robust secure network field in a broadcast frame is depicted in accordance with an illustrative embodiment. In this illustrative example, robust secure network (RSN) field 600 is an example of a robust secure network field that may be found in a beacon frame broadcast by a wireless access point. Robust secure network field 600 may be found in a beacon frame, such as the beacon frame broadcast by wireless access point 122 in message m1 in FIG. 4.

In this illustrative example, robust secure network field 600 includes a number of fields, such as element identifier 610, length 612, version 614, group cipher suite 616, pairwise cipher suite count 618, pairwise cipher suite list 620, authentication and key management (AKM) suite count 622, authentication and key management suite list 624, robust secure network capabilities 626, pairwise master key identifier (PMKID) count 628, and pairwise master key identifier list 630. These fields in robust secure network field 600 are defined by the IEEE 802.11 protocol.

In these illustrative examples, authentication and key management suite list 624 contains a list of authentication and key management suites of different types. These types are indicated by a type value. The type value for an authentication and key management suite is selected to indicate that a wireless access point and a server process, such as wireless access point 122 and server process 311, are configured to establish encrypted wireless connection 327 in the manner described in FIG. 3. This type value is 3 in these illustrative examples.

Figure 7:
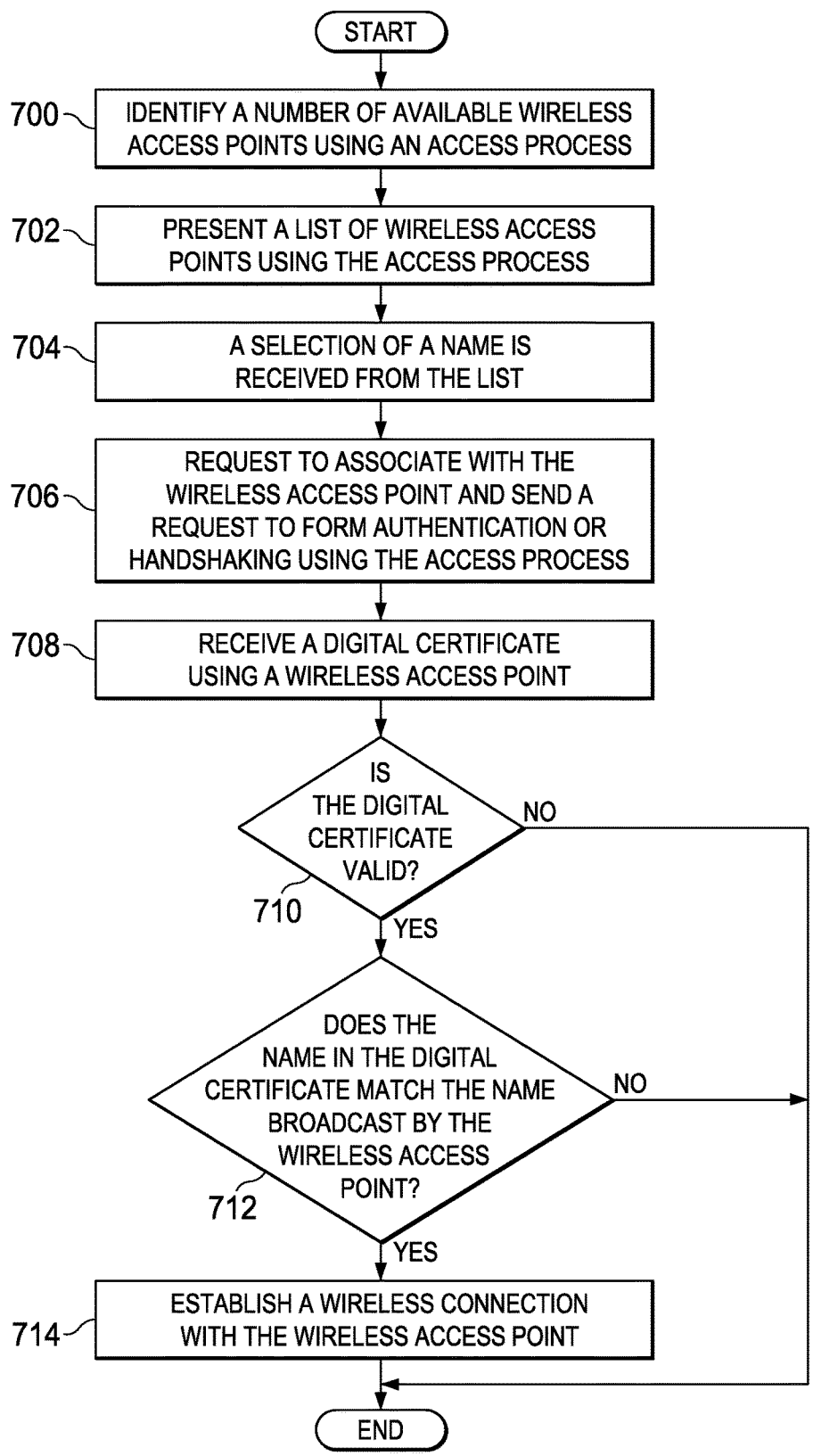
FIG. 7 is a flowchart of a process for establishing a wireless communications link in accordance with an illustrative embodiment.

With reference now to FIG. 7, a flowchart of a process for establishing a wireless connection is depicted in accordance with an illustrative embodiment. The process in FIG. 7 may be implemented in program code run on client device 110 in FIG. 3. In particular, the process illustrated may be implemented as program code for access process 316 for client device 110.

In this illustrative example, access process 316 begins by identifying a number of available wireless access points (step 700). In these examples, the number of available wireless access points is identified based on the names broadcast in the beacon frames from the number of wireless access points. Access process 316 then presents a list of wireless access points (step 702). In these examples, the list contains names for the networks for the different wireless access points. These names may take the form of service set identifiers. The process then receives a selection of a name from the list (step 704).

In response to receiving the selection of a name, access process 316 requests to associate with the wireless access point and sends a request to form authentication or handshaking (step 706). Thereafter, wireless access point 122 receives digital certificate 318 (step 708). A determination is made by access process 316 as to whether digital certificate 318 is valid (step 710). If digital certificate 318 is valid, a determination is made by access process 316 as to whether name 320 in digital certificate 318 matches name 312 broadcast by wireless access point 122 (step 712).

If name 320 in digital certificate 318 matches name 312 broadcast by the wireless access point, a wireless connection is established with wireless access point 122 (step 714), with the process terminating thereafter. In step 714, the establishment of the wireless connection may include establishing a key to encrypt information exchanged over the wireless connection. After the wireless connection is established, information may be exchanged using the wireless connection.

With reference again to step 710, if digital certificate 318 is not valid, the process terminates. The process also terminates if name 320 in digital certificate 318 does not match name 312 for the wireless access point with reference to step 712.

Figure 8:
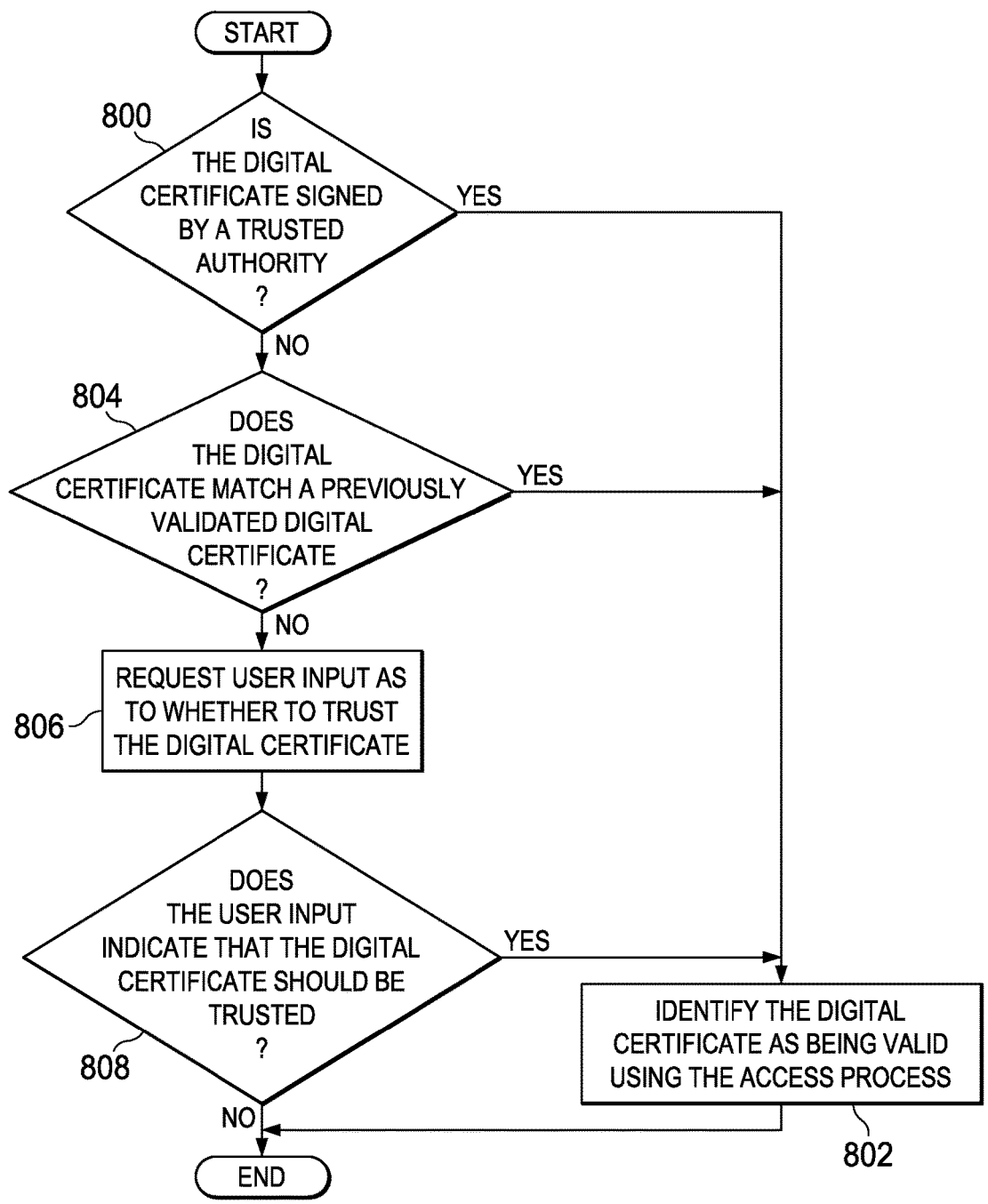
FIG. 8 is a flowchart of a process for determining whether a certificate is valid in accordance with an illustrative embodiment.

With reference now to FIG. 8, a flowchart of a process for determining whether a certificate is valid is depicted in accordance with an illustrative embodiment. The process illustrated in FIG. 8 may be implemented using program code. The process illustrated in FIG. 8 may be an example of a process for checking a digital certificate as performed by client device 110 in FIG. 3. In particular, the process illustrated in this figure may be a more detailed example of one implementation for step 710 in FIG. 7.

The process begins with access process 316 determining whether digital certificate 318 is signed by a trusted authority (step 800). In these illustrative examples, step 800 is performed by determining whether digital signature 321 in digital certificate 318 was signed by certificate authority 322. This determination is made by access process 316 using public key 323 associated with certificate authority 322. If the determination is made that digital signature 321 was signed by certificate authority 322, access process 316 identifies digital certificate 318 as being valid (step 802), with the process terminating thereafter.

Otherwise, if the determination is made that digital signature 321 was not signed by certificate authority 322, a determination is made as to whether digital certificate 318 matches a previously validated digital certificate (step 804). If digital certificate 318 matches a previously validated certificate, access process 316 proceeds to step 802 as described above. Otherwise, access process 316 requests user input 319 as to whether to trust digital certificate 318 (step 806). A determination is made as to whether user input 319 indicates that digital certificate 318 should be trusted (step 808). If the user input indicates that digital certificate 318 should be trusted, access process 316 proceeds to step 802 as described above. Otherwise, the process terminates.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

For example, in some illustrative examples, the determination as to whether the digital certificate is valid and whether the name of the digital certificate matches the name broadcast by the access point in steps 708 and 710 in FIG. 7 may be performed simultaneously or in a different order from that illustrated in FIG. 7.

Thus, the different illustrative embodiments provide a method and apparatus for establishing a wireless connection. In the different illustrative embodiments, in response to receiving a selection of a network using a first name broadcast by a wireless access point, a digital certificate having a second name is obtained. A determination is made as to whether the digital certificate is valid. A determination is also made as to whether the second name in the digital certificate matches the first name broadcast by the wireless access point. In response to the digital certificate being valid and the second name in the digital certificate matching the first name for the wireless access point, a wireless connection is established to the wireless access point. In this manner, preselected keys become unnecessary. This type of authentication and establishment of communications may be more secure than an open connection and less cumbersome than a closed connection.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any system. For the purposes of this description, a computer usable or computer readable medium can be any tangible apparatus that can contain, store, communicate, propagate, or transport the program for use by or in connection with the running of instructions on a system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during running of the code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening networks. Modems, cable modem, and Ethernet cards are just a few of the currently available types of network adapters.

The description of the present invention has been presented for purposes of illustration and description, and it is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for establishing a wireless connection, the method comprising:

receiving a selection of a network using a first name broadcast by a wireless access point;

obtaining, by a processor unit, a digital certificate having a second name from the wireless access point;

determining, by the processor unit, whether the digital certificate is valid by determining whether the digital certificate matches one of a number of digital certificates previously identified by the processor unit as being valid, and responsive to determining that the digital certificate does not match one of the number of digital certificates previously identified as being valid, requesting a user input as to whether to trust the digital certificate;

determining, by the processor unit, whether the second name in the digital certificate matches the first name broadcast by the wireless access point; and responsive to the digital certificate being valid and the second name in the digital certificate matching the first name broadcast by the wireless access point, establishing, by the processor unit, the wireless connection to the wireless access point, wherein the step of establishing, by the processor unit, the wireless connection to the wireless access point comprises:

generating, by the processor unit, a session key for the wireless connection using the digital certificate responsive to the digital certificate being valid and the second name in the digital certificate matching the first name broadcast by the wireless access point; and exchanging, by the processor unit, information with a server using the session key to encrypt and decrypt the information.

2. The method of claim 1 further comprising:

exchanging, by the processor unit, information with the network using the wireless connection established with the wireless access point.

3. The method of claim 1, wherein the step of determining, by the processor unit, whether the digital certificate is valid comprises:

determining, by the processor unit, whether a digital signature in the digital certificate is signed by a trusted certificate authority.

4. The method of claim 1, wherein the first name is a service set identifier and is broadcast using a frame extension that provides an extension to the service set identifier and includes element identifier, length and extended service set identifier fields.

5. The method of claim 3, wherein the second name is a domain name of an entity that requested the digital certificate from the trusted certificate authority.

6. The method of claim 1, wherein the wireless connection is an encrypted wireless connection.

7. The method of claim 1, wherein the network is a wireless network specified by IEEE 802.11 standards.

8. A computer comprising:
a bus;
a storage device connected to the bus;
a processor unit connected to the bus; and
program code stored on the storage device, for execution by the processor to receive a selection of a network using a first name broadcast by a wireless access point, obtain a digital certificate having a second name from the wireless access point, determine whether the digital certificate is valid by determining whether the digital certificate matches one of a number of digital certificates previously identified by the processor unit as being valid, and requesting a user input as to whether to trust the digital certificate responsive to determining that the digital certificate does not match one of the number of digital certificates previously identified as being valid, determine whether the second name in the digital certificate matches the first name broadcast by the wireless access point in response to determining that the digital certification is valid, and establish a wireless connection to the wireless access point using the digital certificate in response to the digital certificate being valid and the second name in the digital certificate matching the first name broadcast by the wireless access point by generating a session key for the wireless connection using the digital certificate responsive to the digital certificate being valid and the second name in the digital certificate matching the first name broadcast by the wireless access point, and exchanging information with a server using the session key to encrypt and decrypt the information.

9. The computer of claim 8, wherein the program code is also executable by the processor to exchange information with the network using the wireless connection established with the wireless access point.

10. The computer of claim 8, wherein the program code determines whether the digital certificate is valid by determining whether a digital signature in the digital certificate is signed by a trusted certificate authority to determine whether the digital certificate is valid.

11. The computer of claim 8, wherein the first name is a service set identifier.

12. The computer of claim 8, wherein the second name is a domain name.

13. A computer program product comprising:

a non-transitory computer readable storage medium;

first program code, stored on the non-transitory computer readable storage medium, responsive to receiving a selection of a network using a first name broadcast by a wireless access point, for obtaining a digital certificate having a second name from the wireless access point;

second program code, stored on the non-transitory computer readable storage medium, for determining whether the digital certificate is valid by determining whether the digital certificate matches one of a number of digital certificates previously identified by the processor unit as being valid, and requesting a user input as to whether to trust the digital certificate responsive to determining that the digital certificate does not match one of the number of digital certificates previously identified as being valid;

third program code, stored on the non-transitory computer readable storage medium, for determining whether the second name in the digital certificate matches the first name broadcast by the wireless access point in response to determining that the digital certification is valid; and fourth program code, stored on the non-transitory computer readable storage medium, responsive to the digital certificate being valid and the second name in the digital certificate matching the first name broadcast by the wireless access point, for establishing a wireless connection to the wireless access point using the digital certificate by generating a session key for the wireless connection using the digital certificate responsive to the digital certificate being valid and the second name in the digital certificate matching the first name broadcast by the wireless access point, and exchanging information with a server using the session key to encrypt and decrypt the information.

14. The computer program product of claim 13 further comprising:
fifth program code, stored on the non-transitory computer readable storage medium, for exchanging information with the network using the wireless connection established with the wireless access point.

15. The computer program product of claim 13, wherein the second program code comprises:
program code, stored on the non-transitory computer readable storage medium, for determining whether a digital signature in the digital certificate is signed by a trusted certificate authority to determine whether the digital certificate is valid.

16. The method of claim 1, wherein the step of obtaining, by the processor unit, a digital certificate comprises:
sending, by the processor unit, an authentication request for network authentication to the wireless access point.

17. The method of claim 1, wherein the digital certificate is used to authenticate an identity of a network and comprises a digital signature, a public key and the second name.

* * * * *